US012809824B2

(12) United States Patent
Varma et al.

(10) Patent No.: US 12,809,824 B2
(45) Date of Patent: Nov. 24, 2026

(54) DATA STORAGE SYSTEM SUPPORTING CONTAINER PERSISTENT VOLUMES USING FILESYSTEM TREE QUOTAS

(71) Applicant: Dell Products L.P., Round Rock, TX (US)

(72) Inventors: Mithun Mahendra Varma, Bangalore (IN); Maneesh Singhal, Bangalore (IN); Pankaj Kumar Roy, Bangalore (IN); Victor Varghese Pengiparambill, Chalakudy (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/976,666

(22) Filed: Dec. 11, 2024

(65) Prior Publication Data

US 2026/0161611 A1 Jun. 11, 2026

(51) Int. Cl.
*G06F 16/182* (2019.01)
*G06F 16/11* (2019.01)
*G06F 16/185* (2019.01)

(52) U.S. Cl.
CPC .......... *G06F 16/183* (2019.01); *G06F 16/128* (2019.01); *G06F 16/185* (2019.01)

(58) Field of Classification Search
CPC .... G06F 16/183; G06F 16/128; G06F 16/185; G06F 16/188; G06F 21/6218; G06F 16/122
USPC ............... 707/640, 641, 645, 661, 724, 827, 707/999.202, 999.203, 646, 678, 679, 707/737, 769, 809, 17.01, 17.044
See application file for complete search history.

(56) References Cited

U.S. PATENT DOCUMENTS 7,818,535 B1 10/2010 Bono et al.
8,924,364 B1 * 12/2014 Zhong .................... G06F 16/13 707/821
9,678,683 B1 * 6/2017 Chen ................... G06F 9/45558
10,037,341 B1 * 7/2018 Bassov ................. G06F 16/185
2005/0050107 A1 * 3/2005 Mane ...................... G06F 16/10
2014/0081979 A1 * 3/2014 Pn ........................ G06F 16/1727 707/E17.037
2020/0241754 A1 * 7/2020 Bett ........................ G06F 3/067
2021/0318824 A1 * 10/2021 Cain ...................... G06F 3/0604
2022/0091871 A1 * 3/2022 Deutsch .............. G06F 9/45558

* cited by examiner

*Primary Examiner* — Md I Uddin
(74) *Attorney, Agent, or Firm* — BainwoodHuang

(57) ABSTRACT

Storage for persistent volumes (PVs) of a container-based host is provided by, in a PV creation operation, (1) allocating a region having a path in the filesystem and assigning a respective tree quota corresponding to a specified PV size, (2) mounting the path in association with a path identifier, and (3) supplying the path identifier to the container-based host for use as a PV identifier. In response to data operation requests of the container-based host including the path identifier as a PV identifier, corresponding operations are performed in the region using the path associated with the path identifier. A large number of tree quotas can be created and thus support scaling PV support as needed for container-based workloads.

14 Claims, 6 Drawing Sheets

DATA STORAGE SYSTEM SUPPORTING CONTAINER PERSISTENT VOLUMES USING FILESYSTEM TREE QUOTAS

BACKGROUND

The invention is related to the field of network-attached storage supporting containerized application workloads.

SUMMARY

Support for persistent volumes (PVs) of data storage of a container-based host system is provided using a filesystem of a data storage system (DSS) by a technique that includes, in a PV creation operation, (1) allocating a respective region having a corresponding path in the filesystem and assigning a respective tree quota to the region, the tree quota corresponding to a specified size of the PV being created, (2) mounting the path in association with a respective path identifier, and (3) supplying the path identifier to the container-based host system for use as a PV identifier of the PV. In response to subsequent data operation requests of the container-based host system including the path identifier as a PV identifier, corresponding operations are performed in the respective region using the path associated with the path identifier. By using tree quotas rather than whole filesystems for respective PVs, the technique avoids certain hard limits of NAS-type data storage systems while significantly scaling the number of PVs to meet demand for container-based systems.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
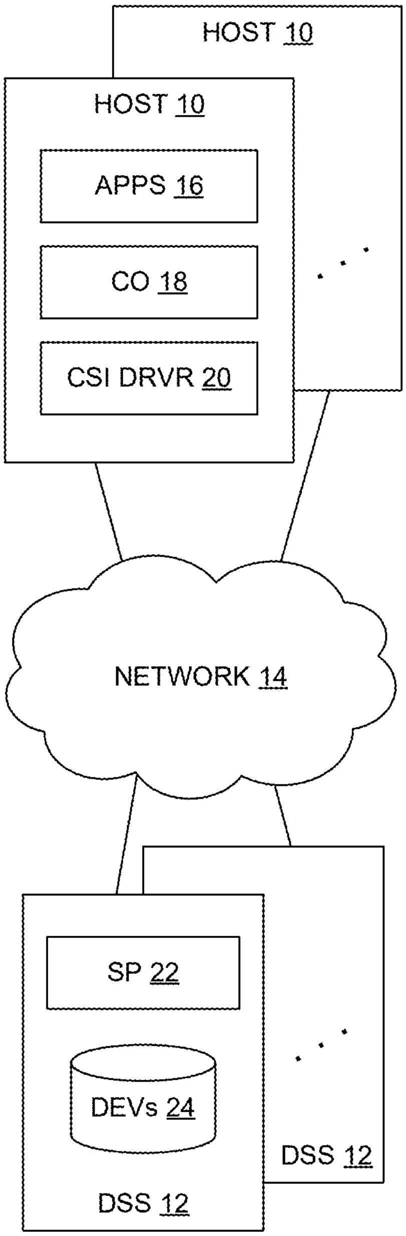
FIG. 1 is a block diagram of a data processing system.

Data storage systems (such as Powerstore® systems by Dell, Inc.) can support specialized Container Storage Interface (CSI) and expose filesystems as persistent volumes (PV) to a container orchestrator (CO) such as Kubernetes®. Some use cases for COs require a large number of PVs, e.g., on the order of one million, with capabilities like snapshots being supported. However, current systems may have architectural limits on the maximum number of filesystems and protocol-type snapshots (volume level), which can impose limits on scaling.

More specifically, in many cases CO workloads require a large number of PVs which are relatively small and short-lived. While a storage system could support PVs by mapping to whole filesystems, there are factors that then limit the possible scaling to larger numbers of PVs, such as:

1. Limitations on the number of volumes that can be created on the storage system for respective PVs.
2. Limitations on the number of snapshots of the PVs that can be created and further used to recreate new PVs of same/similar data.

As an example of the above, in certain existing data storage systems, limitations such as the following may exist:

| Limit type | Value |
|---|---|
| Max snapshots | 25000 |
| Max filesystems | 2000 |
| Max filesystems per NAS server | 125 |
| Max tree quotas per filesystem | 8192 |

A method is described by which a desired scaling can be achieved notwithstanding certain architectural limits of data storage systems. To support such high scaling of PV support, the entity that maps to a PV on a storage system is selected as a tree quota within a filesystem. This resolves the challenge with respect to underlying volume limits encountered within the storage system while creating filesystems. File versioning capabilities of the filesystems (e.g., NFS filesystems) can be used to create snapshots, wherein the contents of tree quotas are bundled into a file and the bundle is versioned into the filesystem (e.g., for later recovery). Together this combination of capabilities helps achieve the desired scale of PVs and PV snapshots in the storage system without needing to increase existing filesystem and snapshot limits.

More specifically, in a disclosed approach a directory hierarchy in a filesystem is exported through a "tree quota" to the CSI driver. The CSI driver maps individual PVs to respective tree quotas. This approach helps ensure that a CO cannot exceed the size provisioned for the PV while also avoiding the possibility that the number of will exceed a system limit. To address the need for snapshots while also avoiding existing system limits, the data under a tree quota can be bundled into a single archive-type file (e.g., .tar, .xz or similar formats) and NFS file versioning can be used to version such bundles, which then serve as snapshots of the respective PVs. This approach helps avoid limits existing limits on volume snapshots such as above.

Based on the example limits above, the disclosed technique enables a single NAS server to support on the order of 1 million PVs as follows:

$$\text{Total } PVS = \text{Total Filesystems in } a\ NAS \text{ server} * \text{Max tree quotas per filesystem} = 125 * 8192 = 1{,}024{,}000$$

Additionally, by using file versioning instead of volume-level snapshots, a large number of PV snapshots can be supported without hitting the system snapshot limit of 25 k.

EMBODIMENTS

FIG. 1 shows a data processing system having a plurality of host computers (HOSTs) 10 coupled to a set of data storage systems (DSSs) 12 by a network 14. The hosts 10 provide for container-based organization and execution of applications (APPs 16), also referred to as a "containerized workload", with management and control provided by a container orchestration (CO) subsystem 18 and use of a container-storage interface (CSI) driver 20. As generally known, containers are lightweight operating environments roughly analogous to virtual machines. One well-known container-based system is the so-called Kubernetes® system. Consistent with common usage, the CO subsystem 18 may also be referred to herein as a "container orchestrator".

The DSS 12 includes storage processing (SP) circuitry 22 and a set of non-volatile storage devices (DEVs) 24 that provide for secondary storage of data as generally known. The SP circuitry 22 may be realized as computer processing circuitry having memory, processors, and interface circuitry as generally known, storing and executing specialized data-storage application(s) that provide a rich set of storage-related functions, also as generally known. In particular, the DSSs 12 provide so-called network attaches storage (NAS) functionality in which storage is visible to the hosts 10 in the form of filesystems and underlying storage volumes. In one embodiment, the DSSs 12 may be realized in the form of purpose-built platforms or appliances such as Powerstore® systems sold by Dell, Inc. In other embodiments, notably including certain cloud computing environments, data storage functionality may be provided using specialized data storage application(s) executed on more generic computing hardware.

Figure 2:
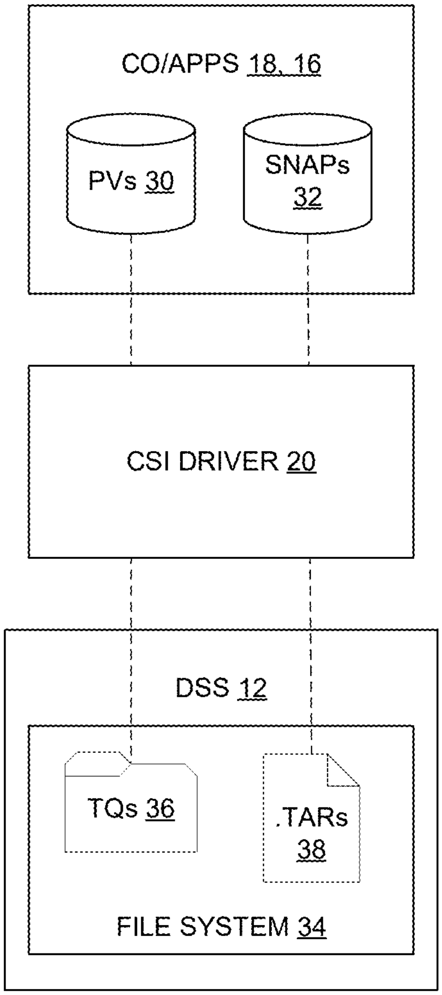
FIG. 2 is a schematic illustration of associations between container host storage objects (PVs, snapshots) and respective resources (TQs, TARs) of a data storage system.

FIG. 2 is a schematic illustration of the manner in which a DSS 12 provides support for persistent volumes (PVs) of the container-based host systems 10, as outlined above. As shown, PVs 30 and snapshots (SNAPs) 32 of the CO 18 and APPs 16 are mapped to corresponding objects in a filesystem 34 on the DSS 12, through operation of the CSI driver 20. In particular, PVs 30 are mapped to directory paths or folders shown as tree quotas (TQs) 36, while SNAPs 32 are mapped to archive-type files shown as .TARs 38 (referring to the known ".tar" type of archive file). Although only one filesystem 34 is shown, it will be appreciated that in general the DSS 12 may store some number of filesystems usable in the illustrated manner (i.e., with TQs 36 and .TARs 38 supporting respective PVs 30 and SNAPs 32 of the hosts 10).

Figure 3:
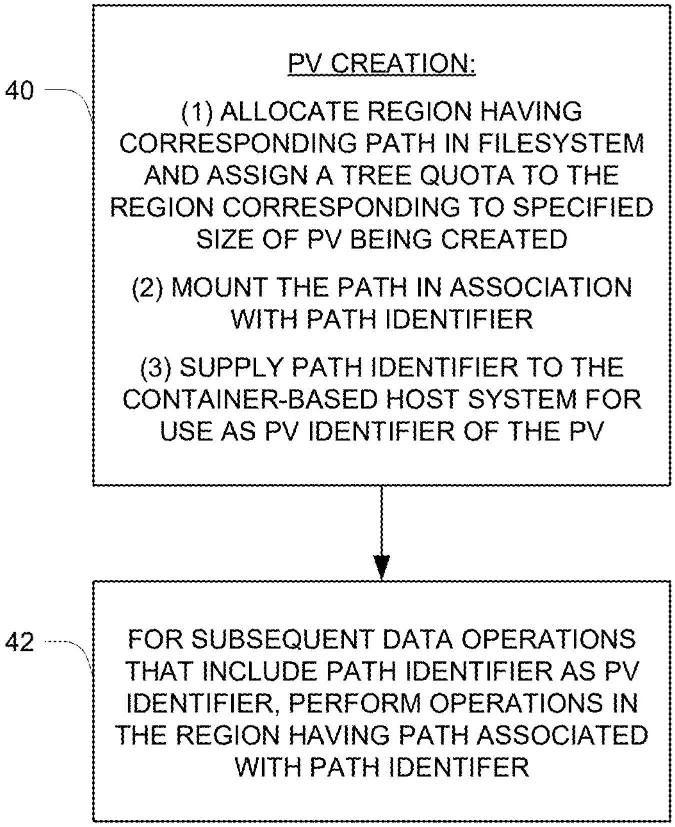
FIG. 3 is a high-level flow diagram of a process for creating a storage system tree quota as part of creating a container host persistent volume (PV)

FIG. 3 is a high-level flow diagram of operations by which persistent volumes (PVs) (e.g., 30) of data storage are provided to a container-based host system (e.g., 10) using a filesystem of a data storage system (DSS, e.g., 12). The indicated steps are performed for creation and use of each PV. Generally, it is required that the host 10 on which the CSI driver 20 is installed has read and write access to the filesystems 34 and exports used in support of PVs 30 and snapshots 32, and that the filesystem protocol (e.g., NFS) supports offload copy or file versioning.

At 40, a PV creation operation includes steps of (1) allocating a respective region having a corresponding path in the filesystem and assigning a respective tree quota (e.g., 36) to the region, the tree quota corresponding to a specified size of the PV being created; (2) mounting the path in association with a respective path identifier, and (3) supplying the path identifier to the container-based host system for use as a PV identifier of the PV. Additional details of this operation are illustrated in a specific example below.

At 42, in response to subsequent data operation requests of the container-based host system that include the path identifier as a PV identifier, the data operations are performed in the respective region using the path associated with the path identifier. In the current context, these data operations will typically be filesystem operations such as creating a new file, opening an existing file, shrinking or expanding the host filesystem that occupies the PV, etc.

While the above description focuses on the PVs (e.g., 30) in particular, another important aspect of the presently disclosed technique is its support for a large number of PV snapshots as well. Examples are given below of creating a snapshot of an existing PV, and creating a new PV from an existing snapshot, both of which are supported by the use of .archive-type files (e.g. tar files 38) on the DSS 12 in the illustrated embodiment.

Figure 4:
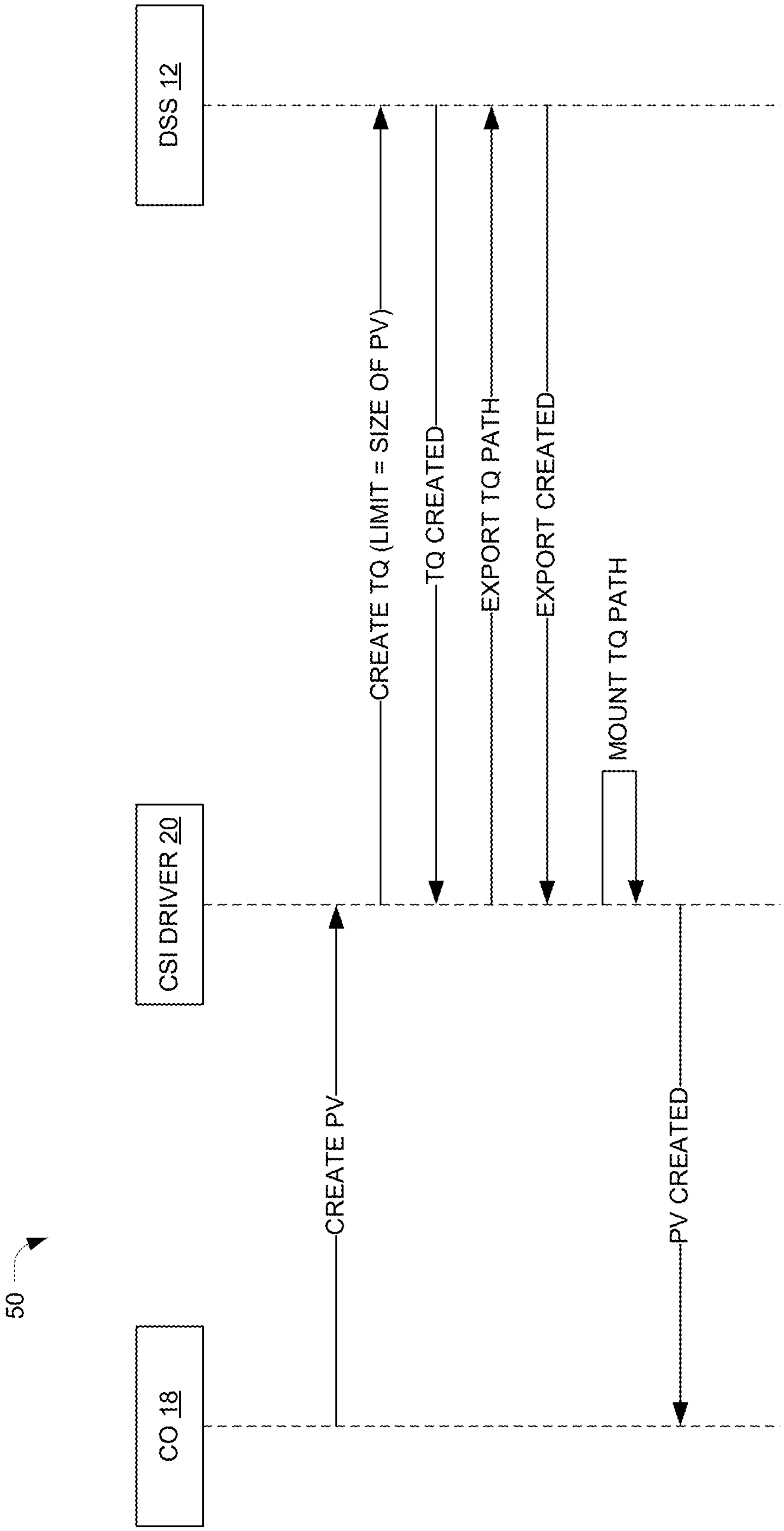
FIG. 4 is a messaging flow diagram for a process of PV creation.
Figure 5:
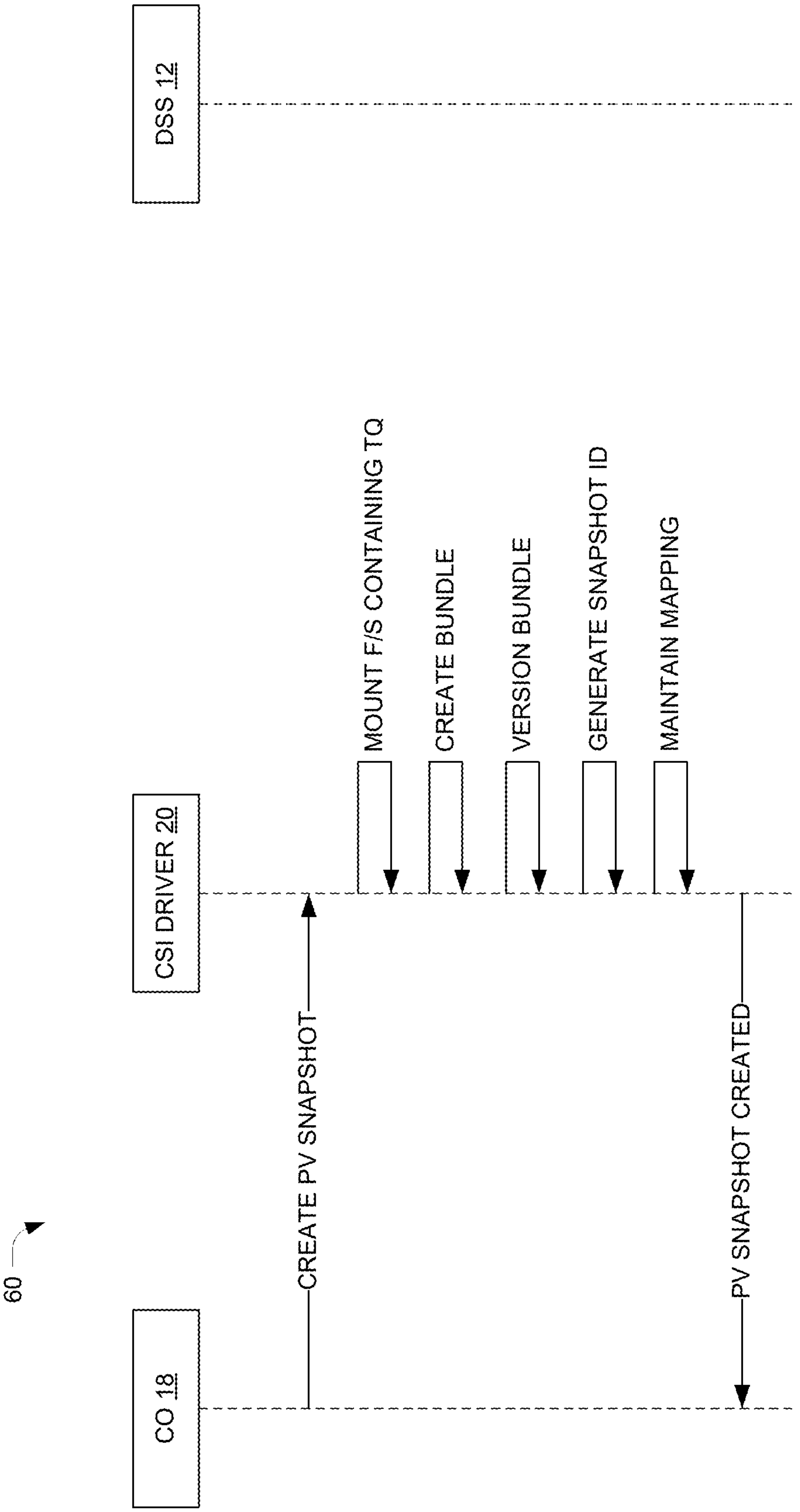
FIG. 5 is a messaging flow diagram for a process of snapshot creation.
Figure 6:
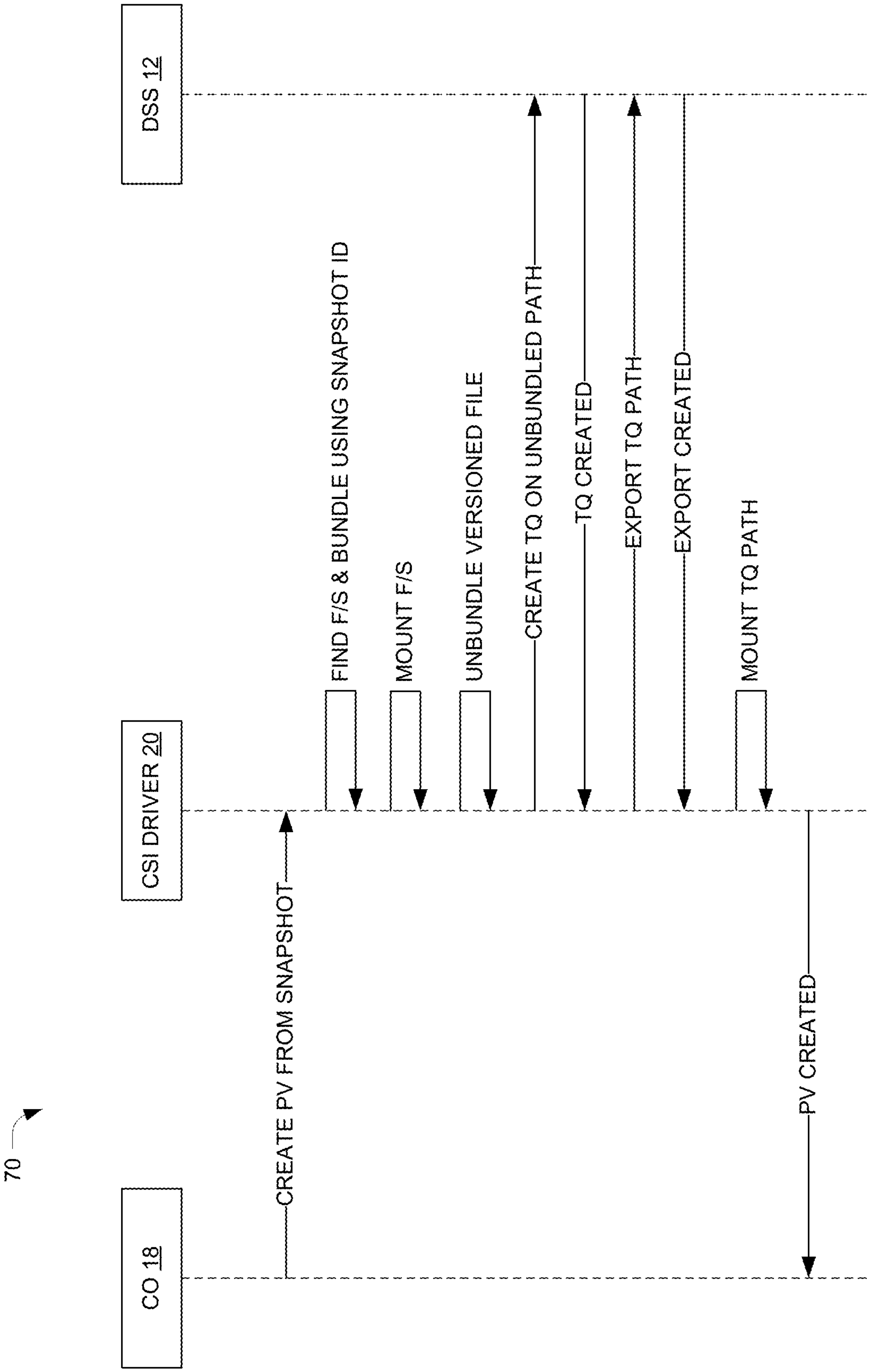
FIG. 6 is a messaging flow diagram for a process of creating a PV from an existing snapshot.

FIGS. 4-6 are messaging diagrams for certain operations involving the CO 18, CSI driver 20, and DSS 12. In these diagrams the CSI driver 20 employs out-of-band signaling to the DSS 12 using a management channel, such as a REST API, for creation of TQs 36 and export of TQ paths. Certain other operations such as creating bundle files etc. are shown as being local to the CSI driver 20, but it will be appreciated that some of these involve regular in-band file operations with the DSS 12, which are omitted for clarity.

FIG. 4 shows details of an example PV creation process 50 involving the CO 18, CSI driver 20, and DSS 12. The process begins with the CO 18 issuing a request to the CSI driver 20 to create a new PV 30. The CSI driver 20 in turn issues a request to the DSS 12 to create a new TQ 36 with a quota limit equal to the PV size as specified in the request from the CO 18. After the DSS 12 indicates successful creation of the TQ, the CSI driver 20 requests export of the TQ path, which is then returned to the CSI driver 20 by the DSS 12. The CSI driver 20 then mounts that TQ path as a PV, in association with a TQ/path identifier (ID), and sends an indication of successful PV creation to the CO 18 which includes the TQ/path ID for use by the CO 18 as a PV identifier (PV ID) for the new PV. The CSI driver maintains the association or mapping between this new PV and the new path ID for subsequent data accesses by the CO 18 or apps 16.

In subsequent use (e.g., step 42 of FIG. 3), either the CO 18 or an app 16 includes this PV ID in operations directed to this new PV, and the CSI driver 20 matches the PV ID of the request to the TQ/path ID of the corresponding TQ, then issues a corresponding operation for that target TQ to the DSS 12 (e.g., a file open, read, or write operation).

It will be appreciated that the process 50 of FIG. 4 also generally includes selection of a target filesystem 34 on the DSS which will contain the TQ path, or indeed the creation of a new filesystem 34 if necessary. Filesystem creation, selection and use may be done in a variety of ways and use various criteria. In one approach, new filesystems 34 are simply created in a linear matter as existing ones are filled. Alternatively, certain associations or affinity may be used, e.g., filesystems 34 may be associated with hosts 10, applications 16, groups of PVs 30, etc. The CSI driver 20 maintains memory of the specific filesystem 34 for each TQ 36 that it has created and associated with a PV 30 for the CO 18.

FIG. 5 shows details of an example snapshot creation process 60. The process begins with the CO 18 issuing a request to the CSI driver 20 to create a new PV snapshot 32 for a "subject" PV 30 identified by a PV ID in the request. The CSI driver 20 in turn mounts the filesystem 34 that contains the TQ 36 for the subject PV 30. The CSI driver 20 also performs the following:

1. CSI driver 20 creates a bundle (e.g., .TAR 38) on the filesystem 34 from the TQ directory structure for the subject PV 30.

2. CSI driver 20 issues a versioning request for the bundle (.TAR 38) on the filesystem 34 using NFS protocol.
3. CSI driver 20 generates a snapshot ID for the new snapshot and maintains a map of this snapshot ID to the bundle version.
4. CSI driver 20 responds to the CO 18 with the snapshot ID (which is then usable for subsequent operations directed to the snapshot, including its use to create a new PV such as described below).

FIG. 6 shows details of an example process 70 of creating a new PV 30 from an existing snapshot 32. The process begins with the CO 18 issuing a request to the CSI driver 20 to create a new PV from an existing snapshot 32 identified by snapshot ID in the request. The CSI driver 20 then performs the following:

1. CSI driver 20 finds the corresponding filesystem (F/S) and versioned file (e.g., .TAR 38) from the map it maintains.
2. CSI driver 20 unbundles the contents of the versioned file as a directory structure ("unbundled path").
3. CSI driver 20 then performs the same steps as in FIG. 4 for creating a new TQ on this directory and returning a completion message with a PV ID to the CO 18.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

While various embodiments of the invention have been particularly shown and described, it will be understood by those skilled in the art that various changes in form and details may be made therein without departing from the scope of the invention as defined by the appended claims.

What is claimed is:

1. A method comprising:

providing persistent volumes (PVs) of data storage to a container-based host system using at least one filesystem of a data storage system (DSS), at least in part by, for each of the PVs:

in a PV creation operation, (1) allocating a respective region having a corresponding TQ path in the filesystem and assigning a respective tree quota (TQ) to the region, the TQ having a quota limit corresponding to a requested size of the PV being created by the PV creation operation, (2) mounting the TQ path as the PV being created, in association with a respective TQ path identifier, and (3) supplying the TQ path identifier to the container-based host system for use as a PV identifier of the PV, wherein the PV creation operation is performed by a container-storage interface (CSI) driver based on receiving a request from a container orchestrator (CO) of the container-based host system to create a new PV;

in response to subsequent data operation requests of the container-based host system including the TQ path identifier as a PV identifier, performing corresponding operations in the respective region using the TQ path identified by the TQ path identifier;

performing a plurality of PV creation operations to create a total number of PVs that is larger than a maximum number of filesystems permitted to be created in the data storage system; and creating a new PV snapshot of an existing PV, at least in part by:

identifying the TQ path for the region for the existing PV;

creating and versioning a bundle file from contents of the region, wherein the CSI driver issues a versioning request for the bundle on the filesystem;

generating a snapshot identifier (ID) for the new snapshot and maintaining a map of the snapshot ID to the bundle version; and supplying the snapshot ID to the container-based host system for use in subsequent host accesses of the PV snapshot, including use of the PV snapshot to create a new PV therefrom.

2. The method of claim 1, wherein the request includes the requested size of the PV.

3. The method of claim 1, further including either creating the filesystem or selecting the filesystem from among a set of existing filesystems of the DSS.

4. The method of claim 1, wherein the bundle file is an archive type file.

5. The method of claim 1, further including identifying the filesystem containing the TQ path for the existing PV.

6. The method of claim 1, further including steps of a process of creating a new PV from the PV snapshot, including:

identifying the filesystem and versioned bundle file of the PV snapshot based on the snapshot ID;

unbundling contents of the versioned bundle file as contents of a new region of the filesystem; and performing steps of a new PV creation operation using the new region and corresponding new TQ and TQ path, including (1) mounting the new TQ path in association with a respective new TQ path identifier, and (2) supplying the new TQ path identifier to the container-based host system for use as a new PV identifier of the new PV, for use in subsequent data operation requests of the container-based host system directed to the new PV.

7. The method of claim 6, performed by a container-storage interface (CSI) driver executing on the container-based host system, wherein the snapshot creation process and new PV creating are performed by the CSI driver based on receiving corresponding requests from a container orchestrator (CO) of the container-based host system.

8. A container-based host computer configured and operative to store and execute computer program instructions to provide persistent volumes (PVs) of data storage to containerized applications using at least one filesystem of a separate data storage system (DSS), by, for each of the PVs:

in a PV creation operation, (1) allocating a respective region having a corresponding TQ path in the filesystem and assigning a respective tree quota (TQ) to the region, the TQ having a quota limit corresponding to a requested size of the PV being created, (2) mounting the TQ path as the PV being created, in association with a respective TQ path identifier, and (3) supplying the TQ path identifier for use as a PV identifier of the PV, wherein the PV creation operation is performed by a container-storage interface (CSI) driver based on receiving a request from a container orchestrator (CO) of the container-based host system to create a new PV;

in response to subsequent data operation requests including the TQ path identifier as a PV identifier, performing corresponding operations in the respective region using the TQ path identified by the TQ path identifier;

performing a plurality of PV creation operations to create a total number of PVs that is larger than a maximum number of filesystems permitted to be created in the data storage system; and creating a new PV snapshot of an existing PV, at least in part by:

identifying the TQ path for the region for the existing PV;

creating and versioning a bundle file from contents of the region, wherein the CSI driver issues a versioning request for the bundle on the filesystem;

generating a snapshot identifier (ID) for the new snapshot and maintaining a map of the snapshot ID to the bundle version; and supplying the snapshot ID to the container-based host system for use in subsequent host accesses of the PV snapshot, including use of the PV snapshot to create a new PV therefrom.

9. The container-based host computer of claim 8, wherein the request includes the requested size of the PV.

10. The container-based host computer of claim 8, wherein the PV creation operation further includes either creating the filesystem or selecting the filesystem from among a set of existing filesystems of the DSS.

11. The container-based host computer of claim 8, wherein the bundle file is an archive type file.

12. The container-based host computer of claim 8, wherein the snapshot creation process further includes identifying the filesystem containing the TQ path for the existing PV.

13. The container-based host computer of claim 8, wherein the computer program instructions further include instructions of a process of creating a new PV from the PV snapshot, including:

identifying the filesystem and versioned bundle file of the PV snapshot based on the snapshot ID;

unbundling contents of the versioned bundle file as contents of a new region of the filesystem; and performing steps of a new PV creation operation using the new region and corresponding new TQ and TQ path, including (1) mounting the new TQ path in association with a respective new TQ path identifier, and (2) supplying the new TQ path identifier to the container-based host computer for use as a new PV identifier of the new PV, for use in subsequent data operation requests of the container-based host system directed to the new PV.

14. The container-based host computer of claim 13, wherein the snapshot creation process and new PV creating are performed by a container-storage interface (CSI) driver executing on the container-based host computer based on receiving corresponding requests from a container orchestrator (CO) of the container-based host computer.

* * * * *